US006477301B1

United States Patent
Anthon et al.

(10) Patent No.: US 6,477,301 B1
(45) Date of Patent: Nov. 5, 2002

(54) MICRO-OPTIC COUPLER INCORPORATING A TAPERED FIBER

(75) Inventors: Douglas W. Anthon, Wheaton, IL (US); James H. Fisher, Batavia, IL (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 2 days.

(21) Appl. No.: 09/593,648

(22) Filed: Jun. 13, 2000

Related U.S. Application Data

(63) Continuation-in-part of application No. 09/090,505, filed on Jun. 4, 1998, now Pat. No. 6,088,153, which is a continuation-in-part of application No. 08/883,489, filed on Jun. 26, 1997, now abandoned.

(51) Int. Cl.[7] .............................. G02B 6/26; G02B 6/42
(52) U.S. Cl. ..................... 385/43; 385/50; 359/341.1; 359/341.3
(58) Field of Search ............................... 385/43, 33–35, 385/50–52, 24; 359/341.1–341.5

(56) References Cited

U.S. PATENT DOCUMENTS

| | | | | |
|---|---|---|---|---|
| 3,864,019 A | * | 2/1975 | Smolinsky et al. ........... 385/49 |
| 4,184,738 A | * | 1/1980 | Wright ........................... 385/8 |
| 4,763,976 A | * | 8/1988 | Nolan et al. ................. 385/127 |
| 4,807,954 A | * | 2/1989 | Oyamada et al. ............. 385/43 |
| 5,555,330 A | | 9/1996 | Pan et al. ..................... 385/39 |
| 5,608,831 A | * | 3/1997 | Pan ............................. 385/85 |
| 5,689,595 A | * | 11/1997 | Pan ............................. 385/27 |
| 5,729,643 A | * | 3/1998 | Hmelar et al. ................ 385/43 |
| 5,818,630 A | | 10/1998 | Fermann et al. ............ 359/341 |
| 5,933,271 A | * | 8/1999 | Waarts et al. ............... 359/341 |
| 6,020,991 A | | 2/2000 | Yoshinori et al. ........... 359/341 |
| 6,023,542 A | * | 2/2000 | Pan et al. ..................... 385/24 |
| 6,249,625 B1 | * | 6/2001 | Pan ............................. 385/43 |
| 6,278,816 B1 | * | 8/2001 | Keur et al. ................... 385/29 |

FOREIGN PATENT DOCUMENTS

| | | |
|---|---|---|
| DE | 19645542 | 5/1998 |
| JP | 2000105325 | 11/2000 |
| WO | WO 99/54765 | 10/1999 |

* cited by examiner

Primary Examiner—John D. Lee
Assistant Examiner—Scott Knauss
(74) Attorney, Agent, or Firm—Hubert J. Bernhardt, III; Kenneth M. Massaroni; Shelley L. Couturier

(57) ABSTRACT

Systems and methods are described for the construction of micro-optical couplers incorporating optical tapers to reshape multimode optical inputs. Incorporating tapers allows the spatial properties of the multimode inputs to be adjusted to match to the spatial properties of the output fiber, even in systems that are limited to unity-magnification imaging optics. In an exemplary embodiment, a larger-core multimode fiber and a smaller-core double-clad fiber are glued into a glass capillary, with the multimode fiber tapering to a smaller diameter inside the capillary. Polishing the capillary to expose the taper gives a multimode core that is smaller than the double-clad core. Imaging with unity magnification through a GRIN lenses and a dichroic reflector transfers the multimode input efficiently to the double-clad fiber with greater efficiency than would have been possible with the same optics and an untapered fiber. The dichroic reflector is transparent to a second singlemode signal input, which is collimated by a second GRIN lens and coupled to through the reflector to the core of the double-clad fiber. An isolator may be included in the signal beam path, and the double-clad fiber may be replaced by a double-clad gain fiber.

12 Claims, 2 Drawing Sheets

MICRO-OPTIC COUPLER INCORPORATING A TAPERED FIBER

RELATED APPLICATIONS

This application is a continuation-in-part of U.S. patent application Ser. No. 09/090,505, entitled "Multi-functional Optical Isolator," filed on Jun. 4, 1998 by Anthon et al. (now U.S. Pat. No. 6,088,153) and assigned to the assignee hereof and incorporated by reference herein which is a continuation-in-part of U.S. Ser. No. 08/883,489 filed Jun. 26, 1997, now abandoned.

FIELD OF THE INVENTION

This invention relates to optical couplers, and, more particularly, to systems and methods for micro-optic couplers incorporating fiber tapers.

BACKGROUND OF THE INVENTION

Cladding-pumped fiber lasers and optical amplifiers that use a fiber-coupled multimode laser diode to pump a gain medium consisting of a singlemode core embedded in a multimode waveguide have been increasingly common as a means of producing singlemode fiber lasers and fiber amplifiers with high output powers. After the early work of Maurer, (U.S. Pat. No. 3,808,449, issued in 1974), the concept was refined by Snitzer et al., (U.S. Pat. No. 4,815,079, issued in 1989), Gapontsev et al. (Patent No. WO96/20519 issued in 1996), DiGiovanni (U.S. Pat. No. 5,659,644, issued in 1996) and many others.

One characteristic feature of cladding-pumped fiber lasers is that the pump absorption decreases as the area of the multimode waveguide increases. It is therefore desirable to use the smallest waveguide area that is consistent with the brightness of the pump source. As a result, the double-clad fibers tend to be small diameter fibers with large numerical apertures. This allows the absorption to be maximized, and minimizes the required fiber length. It is also true that for the same brightness, the optimum coupling efficiency for the multimode pump sources usually is obtained with a larger fiber and a smaller numerical aperture. This is a result of matching the fiber diameter to the emitting aperture of the multimode diodes. This situation results in a need for some form of beam reshaping in the optical system connecting the pump lasers with the cladding-pumped device. A variety of imaging and non-imaging optical devices can be used to make such transformations, including both GRIN lenses and fiber tapers, as has been recognized in some of the optical systems proposed in the prior art. For example, DiGiovanni et al. U.S. Pat. No. 5,659,644 ('644 Patent) shows a combined taper and coupler in which a seven-fiber hexagonal bundle is drawn down by a factor of two to convert six low-divergence pumps into a single high-divergence source that matched their double-clad waveguide geometry.

One form of pump-signal beam coupler is based on the micro-optic coupler commonly used as singlemode devices. Typical examples of such devices include the Fiber-Wave Length Division Multiplexer (FWDM) and Isolator-Wave Length Division Multiplexer (IWDM)-series devices made by E-Tek Dynamics of San Jose, Calif. A similar device using a multimode fiber is described by the DiGiovanni et al. '644 Patent. These devices use GRIN lenses and a dichroic reflector to collimate the inputs from a pump fiber and a signal fiber and then to image them into a common output fiber. As imaging systems, these devices work equally well with either singlemode or multimode fibers. They can be turned into components for cladding pumped devices by replacing the pump and common fibers with double-clad fibers that permit simultaneous propagation of a singlemode signal and a multimode pump. Such devices are described in an earlier patent application entitled "Multifunctional Optical Isolators" that is incorporated herein by reference. If singlemode fibers are spliced to the ends of the double-clad fibers, they serve as mode filters and allow the device to be aligned as if it were a singlemode device. Not only is this compatible with the manufacturing of the existing parts, but it also ensures that the fibers can be readily aligned with sub-micron precision. The singlemode core in the pump fiber does not affect the propagation of the multimode pump beam, which propagates primarily in the outer waveguide of the fiber. The double-clad fiber can be regarded as a complex multimode fiber, with an outer core diameter defined by the outer waveguide with the added core having no deleterious effect on the performance of the device. Using a simple multimode fiber (i.e. a fiber with the same outer core diameter but without the singlemode core) is also possible. This was as suggested by DiGiovanni et al. in the '644 Patent, but has the disadvantages that it increases the number of fiber types in the device and that singlemode alignment procedures can no longer be used.

The efficiency of such devices will be maximized if multiple functions can be applied to the beam passing through the device. The signal beam can be most easily addressed in designs where the pump fiber and the output fiber are attached to one end of the device and where the signal wavelength is transmitted through the device. In particular, an isolator or a filter can be incorporated into the signal beam path, as was discussed in an earlier application, and as is done in the previously-mentioned E-Tek IWDM device. Transmitting the pump beam through the device allows pump beam reshaping to be accomplished, as noted by DiGiovanni et al. in the '644 Patent. Unfortunately, existing devices do not allow both beams to be manipulated in the device, so that a device with an isolator and pump beam reshaping cannot be built.

Since it is highly desirable to incorporate a device such as an isolator into the signal beam path, it is desirable to identify alternative means for reshaping the pump beam. Existing micro-optic couplers are simple and robust, but in the reflected channel they are unity-magnification systems that do not provide the desired beam shaping. Beam shaping can be accomplished with an external component, such as a GRIN lens or fiber taper, placed between the pump diode and the coupler. Such an approach is undesirable because it adds a component, introduces losses and in the case of the fiber taper, entails a rather difficult splice between a precisely fabricated taper and smaller-core fiber in the coupler.

Directly incorporating the beam shaping into the pump-signal coupler is desirable because it simplifies the device. It is also desirable because it reduces the number of splices associated with the device. In general, minimizing the number of splices will also enhance the efficiency. This applies to the splice to an external beam-shaping optic as well as the splice between the output fiber and the gain fiber. Devices that minimize the number of splices by directly incorporating both a beam reshaping optic (such as a taper) or a gain fiber are likely to maximize efficiency.

Accordingly, a need exists for systems and methods for efficient and multi-functional micro-optic couplers that can incorporate isolators or filters into the signal path, pump beam reshaping optics into the pump path and double-clad gain fiber into the common path.

SUMMARY OF THE INVENTION

This invention addresses the prior problems and provides for systems and methods of reducing loss in devices utilizing double-clad gain fibers.

This invention incorporates one or more tapered multimode optical fibers into a micro-optic coupler to manipulate the shape of a multimode beam. In one embodiment, the invention is used with a singlemode signal beam, and is configured to include a collimated free-space region where a device such as an isolator can be placed in the signal beam without interfering with the pump beam. In this embodiment, the invention further provides for a double-clad fiber whose multimode section is matched to the output of the optical taper and whose singlemode core is coupled to the singlemode signal beam. This double-clad fiber can be an undoped fiber spliced to a double-clad gain fiber, or it can be the gain fiber itself. In an alternative embodiment, the outputs of two, tapered multimode fibers can be combined into a single, reshaped multimode output.

For purposes of redundancy, it is often desirable to combine two pump sources in an amplifier. Two sources at different wavelengths can be combined using a dichroic reflector in a unity-magnification micro-optic coupler with identical multimode fibers at the three fiber ports. The output of this pump combiner can then be coupled to the pump-signal combiner, where a taper could be used to reshape the combined beams for maximum efficiency. Tapers could also be used at the two inputs to the pump combiner, so that beam shaping would occur in the pump combiner instead of the pump-signal combiner. This represents an alternative embodiment of the invention that can be useful for retrofitting devices where a pump-signal combiner with non-tapered fibers is already in use.

One advantage of this invention is that it provides a way of incorporating beam-shaping optics into a micro-optic coupler without changing the other features of the device. For a double-clad beam combiner, it allows the incorporation of beam-shaping elements without perturbing the collimated signal beam path where isolators or filters are incorporated. For a multimode beam combiner, it allows beam shaping to be applied to both multimode inputs without changing the design of the unity magnification device. Another advantage of the invention is that the use of internal beam shaping optics eliminates the substantial inefficiencies that occur if the beam shaping elements are not used, without the loss associates with external beam shaping optics. Another advantage of this invention is that it allows devices that incorporate the gain fiber directly, eliminating a potentially troublesome double-clad splice. Yet another advantage of this invention is that incorporating the taper into the coupler reduces the mechanical constraints on the taper, and makes the taper fabrication process less demanding.

Other objects and advantages of this invention will become apparent to those skilled in the art upon review of this document, the Figures and the claims.

DETAILED DESCRIPTION

Figure 1:
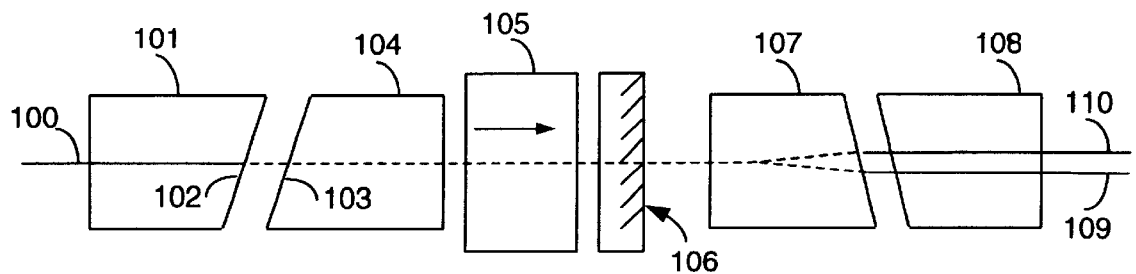
FIG. 1 is a schematic view of a micro-optic isolator-coupler hybrid device.

FIG. 1 is an exemplary schematic view of a hybrid isolator-coupler system showing how the pump and signal wavelengths are combined for coupling into the gain fiber. The optical signal is input from the left in fiber 100, which is a conventional singlemode fiber at the signal wavelength of about 1550 nanometers. This fiber 100 is mounted in a capillary tube 101 and is terminated with its angled endface 102 butted up against the angle-polished endface 103 of the graded refractive index (GRIN) lens 104. The optical signal propagates through the GRIN lens 104 and passes through the optical isolator 105 as a collimated beam. Note that other elements such as bandpass filters could also be placed in this collimated region. This beam is then incident on the dichroic reflector 106, which transmits the signal wavelength into the GRIN lens 107. The signal beam is then focused towards the two-fiber capillary 108 and onto the singlemode core of fiber 109. A pump beam is incident from the second fiber in the capillary, fiber 110. The parts are configured so this pump beam is collected by the GRIN 107, reflected by the dichroic reflector 106 and imaged with unity magnification through the GRIN lens 107 onto the output fiber 109. The coupler thus serves to place the signal and pump beams in a co-propagating configuration in the output fiber 109. The coupler is equivalent to the isolator- wavelength division multiplexer (IWDM) available, for example, from E-Tek Dynamics, Inc. of San Jose, Calif., model IWDM 980/1550.

Figures 2, 3, 4:
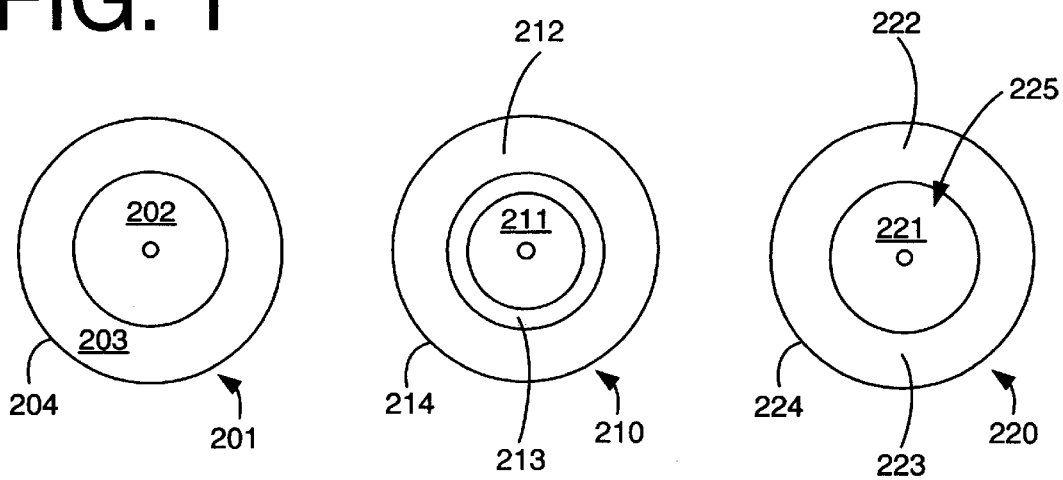
FIG. 2 is a cross-sectional view of a first fiber that can be incorporated into the isolator-coupler hybrid of FIG. 1 for use with double-clad devices.
FIG. 3 is a cross-sectional view of a second fiber that can be incorporated into the isolator-coupler hybrid of FIG. 1 for use with double-clad devices.
FIG. 4 is a cross-sectional view of a third fiber that can be incorporated into the isolator-coupler hybrid of FIG. 1 for use with double-clad devices.

FIGS. 2, 3 and 4 show cross-sectional views of fibers that can be used in the system of FIG. 1. The conventional optical fiber 201 consists of a core 202, that can for instance have a numerical aperture of 0.12. For a fiber that is singlemode at the 1550 nm signal wavelength, the core diameter is 8 micrometers, while for singlemode operation at both 980 and 1550 nm, the core diameter must be reduced to 5 micrometers. A fiber cladding 203 having for instance, a diameter of 125 micrometers is surrounded by a 250-micrometer diameter acrylate buffer 204, both for mechanical protection and to attenuate any power propagating outside of the fundamental mode confined by the core. Fiber 100 in the singlemode IWDM device, such as one available from E-Tek Dynamics described above, has an 8-micrometer core, while fibers 109 and 110 have 5-micrometer cores.

A double-clad pump fiber 210 shown in FIG. 3 consists of a core 211 that is singlemode at the pump and signal wavelengths embedded in a concentric multimode waveguide 212 that is large enough in diameter to accommodate the pump beam. The waveguide is defined by a region of low-index glass 213, and the fiber is surrounded by a 250-micrometer diameter acrylate buffer 214. In a typical case, the core has a diameter of 5 micrometers and a numerical aperture of 0.12, while the multimode waveguide has a diameter in the range between 85 and 105 micrometers and a numerical aperture of about 0.22. A 250-micrometer diameter acrylate buffer 214 surrounds the 125-micrometer outside diameter of the outer cladding of the fiber, exactly as in the conventional singlemode fiber.

A double-clad gain fiber 220 illustrated in FIG. 4 has a core 221 with a diameter of about 4.5 micrometers and a numerical aperture of about 0.20. The core 221 is predominantly fused silica, but it may be doped with a variety of materials including, for instance, phosphorous and/or cerium, in addition to the active ytterbium and erbium atoms. It is surrounded by a silica waveguide 222 with a scalloped outer boundary 225, and an average diameter of 85 micrometers. The lower refractive index of the fluorosilicate outer layer 223 results in a numerical aperture of 0.22. For simplicity, this can be designated as a 4/85/125, 0.22 NA fiber. As in fibers 201 and 210, a 250-micrometer-diameter acrylate buffer 224 surrounds the fiber. The optical fiber 220 can be fabricated as disclosed in Application Ser. No. 09/448,101, entitled "Optical Fiber With Irregularities At Cladding Boundary" (now U.S. Pat. No. 6,411,762) and is incorporated by reference herein.

A fiber 210 utilized in fibers 109 and 110 in FIG. 1 produces a double-clad coupler. Typically, for both fibers 109 and 110, the core has a diameter of 5 micrometers and a numerical aperture of 0.12, while the multimode waveguide has a diameter of 95 micrometers and a numerical aperture of 0.22. This would be designated as a 5/95/125, 0.22 NA fiber. The singlemode properties of this device are identical to those of the singlemode device described above, except that the double-clad fibers have replaced the original singlemode fibers. If fibers that are singlemode at the pump wavelength are spliced as mode filters onto both double-clad fibers, the device can be aligned in exactly the same way as the singlemode device, by maximizing the singlemode throughput.

Figure 5:
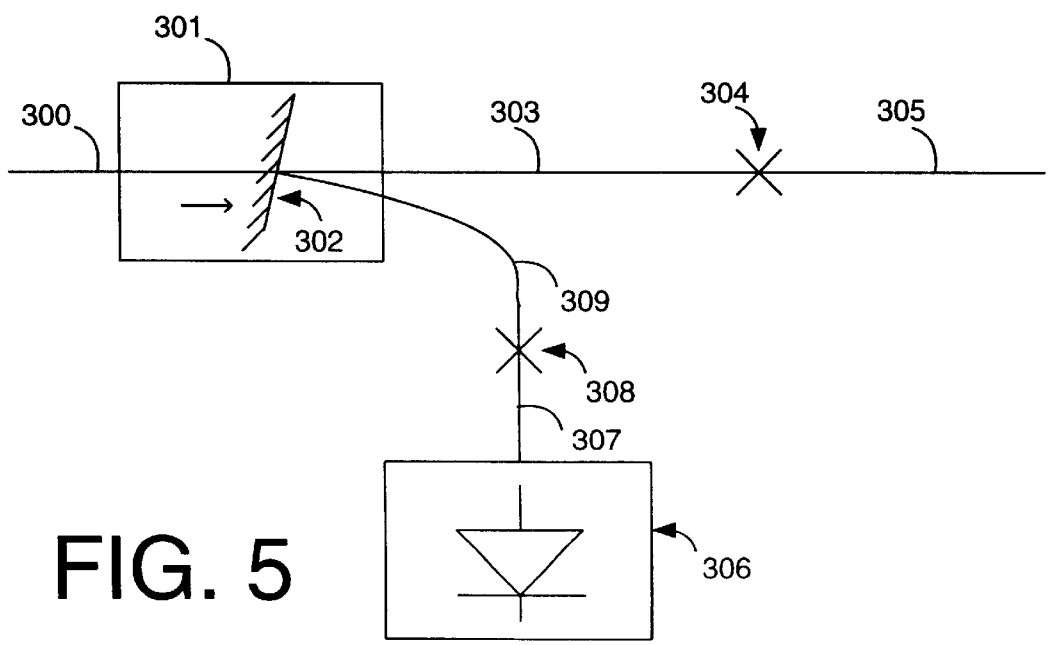
FIG. 5 is a schematic view of the double-clad coupler coupled to a pump diode and a gain fiber.

FIG. 5 shows how a double-clad coupler 301 is coupled to a pump diode 306 and a gain fiber 305. A signal, on fiber 300, enters the isolator-coupler 301 and is imaged through the dichroic reflector 302 to the double-clad fiber 303. The signal then passes through the fusion splice 304 to the gain fiber 305. The output pump light from the laser diode 306 is coupled to fiber 307, which is typically a multimode fiber with a core diameter of for instance, 105 micrometers and a numerical aperture of 0.15. This would be designated as a 105/125, 0.15 NA fiber. It then passes through fusion splice 308 to double-clad fiber 309. The output of this fiber is reflected from the dichroic reflector 302 and is then coupled into the double-clad fiber 303, passed through the fusion splice 304 to the gain fiber 305, which for instance, has a multimode diameter of 0.22 and a diameter of 85 micrometers. A challenge associated with this design is finding the optimum diameter for fiber 303. The loss at a multimode splice is determined approximately by the ratio of the areas of the two fibers being spliced. Going from the 105/125, 0.15 NA pump fiber to the 5/85/125, 0.22 NA gain fiber via a double-clad fiber with any intermediate diameter will give at least the same loss as splicing the two fibers directly together. The 95-micrometer diameter suggested above for the multimode waveguide is a typical compromise value.

The efficiency of the coupler 301 can be increased by matching the diameter of fibers 303 and 309 to that of the gain fiber 305, and then replacing the fusion splice 308 with some form of beam shaping optic such as a GRIN lens or a fiber taper. This is possible because the brightness of a 0.15 NA fiber with a diameter of 105 micrometers is larger than that of a fiber with a 0.22 NA and a diameter of 85 micrometers. The combination of a brightness-conserving transition between fibers 307 and 309 and a matched-diameter splice at 304 will reduce (but not eliminate) the losses in the system.

Figure 6:
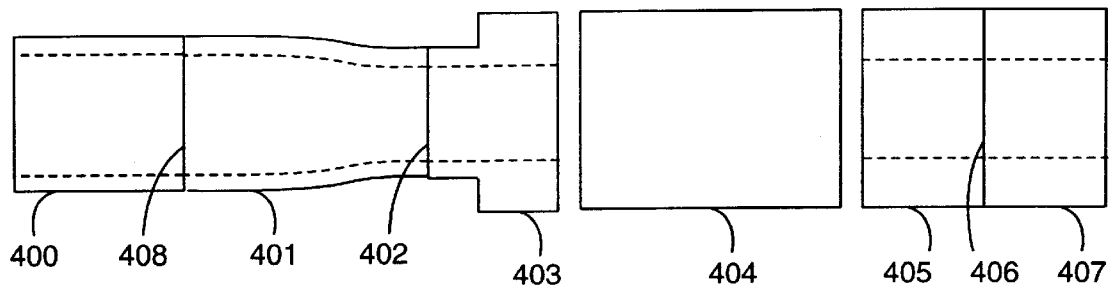
FIG. 6 is a schematic view of a fiber taper for use with the micro-optic isolator-coupler illustrated in FIG. 1.

FIG. 6 is a schematic view of a fiber-tapered to further reduce system losses. The 105/125, 0.15 NA fiber 400 from the diode is spliced 408 to a short length of 5/105/125, 0.22 NA fiber 401 that is tapered to an 4/84/105 endface. This fiber (or the equivalent tapered 105/125, simple multimode fiber) is then joined with fusion splice 402 to the 5/85/125, 0.22 NA double-clad fiber 403. Splice 402 is difficult because surface tension tends to distort splices between fibers with different diameters. To avoid this, fiber 403 has a 100-micrometer etched diameter to match that of the end of the taper. Such etching can be accomplished, for example, using hydrofluoric acid. The output of fiber 403 is imaged with unity magnification through the GRIN lens system 404 to fiber 405. Although fibers 403 and 405 are identical, there may still be losses at this point, as spherical aberration or defocusing may cause the optical input to overfill the multimode area of fiber 405. The pump light then propagates through the fusion splice 406 to the gain fiber 407, with some small loss at the splice 406.

The losses in this system are small, but not negligible. In particular, although splices 406 and 408 are between fibers with nominally identical diameters, small differences introduced by fabrication tolerances may introduce significant splice losses. A more serious problem is the difficulty associated with making the splice 402. Accurately matching the core and outside diameters of fibers 401 and 403 requires exceptionally accurate control of the tapering and etching processes, and makes the device difficult to implement. Losses due to spherical aberration and defocus at GRIN lens system 404 may also be significant.

Figure 7:
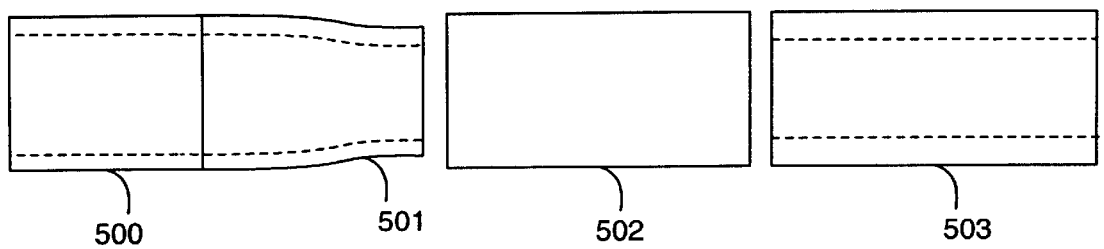
FIG. 7 is a schematic view of a tapered fiber and a double-clad gain fiber used with the coupler of FIG. 6, in accordance with this invention.

A design that overcomes many of these difficulties is shown in FIG. 7. The 105/125, 0.15 NA fiber 500 from the diode is spliced to a 5/105/125 fiber 501 with a 0.22 NA that matches that of the double-clad fiber 503. The 0.15 NA of the incoming light and the 0.22 NA outgoing fiber allow a taper diameter reduction of 15/22, giving a minimum output of 3/71/85 micrometers. The 85-micrometer diameter of the double-clad fiber imposes a maximum output of 4/85/101 micrometers. This wide range of diameters indicates that, unlike with spliced fibers, exceptionally accurate control of the tapering processes is not required. The output of the taper is directly imaged through the GRIN lens 502 to the gain fiber 503. This not only eliminates the need to splice to the end of the taper, but also eliminates the splice to the gain fiber. Eliminating this splice not only reduces the splice loss, but it also eliminates a point where the signal power can be exchanged between the inner and outer waveguides of the double-clad fiber. As discussed in application Ser. No. 09/539,632, entitled "Noise Reduction Techniques for Cladding Pumped Optical Amplifier," (now U.S. Pat. No. 6,278, 816) included herein by reference, such coupling can constitute a highly undesirable source of multi-path noise in the amplifier, so eliminating this splice has the potential to significantly improve the performance of the amplifier. All of these devices can be aligned by adding singlemode filters and using the conventional singlemode alignment techniques. The taper has little effect on this alignment procedure, because tapering the singlemode core simply shifts the singlemode cutoff to shorter wavelengths and, for alignment purposes, the output remains singlemode. Note that the equivalent taper can also be made from a 105/125 simple multimode fiber, but, as before, the alignment procedure will be less precise.

It should be emphasized that either embodiments can be implemented separately, giving the two devices that result when fibers 405 and 406 in FIG. 6 are exchanged with fiber 503 in FIG. 7. In fact, it may sometimes be desirable to build the coupler 301 without the gain fiber 407, because the gain fiber 407 introduces complexities that may outweigh the improved device performance. One such complexity is the fact that the optimum length for the gain fiber must be determined before the coupler is built. Another is that gain fiber absorbs at the wavelengths used for aligning and testing the device. Using well-characterized fiber can eliminate the first problem, and shifting to non-absorbing or bleaching wavelengths can avoid the second, but the solutions add to the complexity of the device. In the case of ytterbium/erbium fiber, for example, well-characterized fiber exists, alignment sources exist at 1064 nm and 1625 nm, and 1550-nm passive loss measurements can be made at powers above 50 mW where the gain fiber absorption is bleached. If suitable sources are not available, the use of an undoped double-clad fiber may be preferable.

Figure 8:
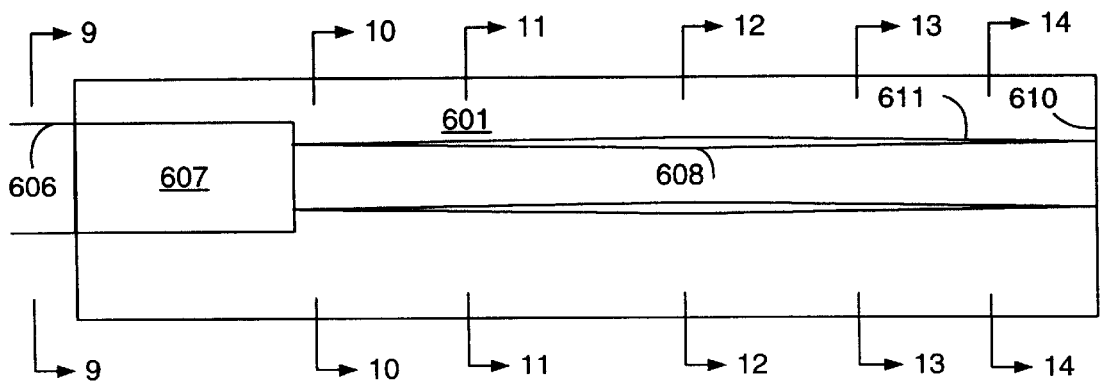
FIG. 8 is a schematic view of a fiber taper incorporated into a capillary used in micro-optic hybrid devices.
Figures 9, 10, 11, 12, 13, 14:
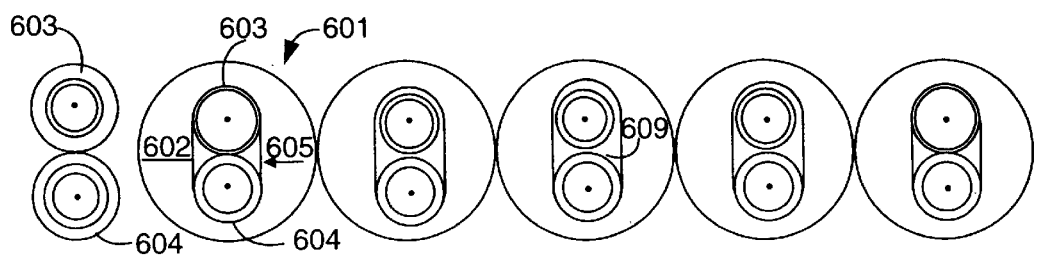
FIGS. 9–14 are cross-sectional views taken along correspondingly labeled lines 9—9 through 14—14 in FIG. 8.

Reducing the accuracy of the tapering process is beneficial only if it does not simultaneously introduce a new set of exacting mechanical tolerances. It is useful to show that this does not occur. The capillary, analogous to capillary 108 in FIG. 1, shown schematically in FIG. 8, can consists of a 1.8-mm diameter cylinder of glass 601, with an oblong hole 602 into which pump fiber 603 and double-clad fiber 604 are mounted with epoxy 605. The fiber buffer 606 extends 1 mm into the counterbore 607, so when the capillary is polished to its final length of about 6 mm, the exposed fiber end will be 5 mm from the end of the fiber buffer. To produce a useful tapered device it is necessary to control the buffer-taper distance so the taper minimum 608 can be placed in the correct location. It has been found that this distance is easily controlled during fabrication, and furthermore that fine adjustment of the taper location is possible during mounting because the taper is clearly visible through the wall of the glass capillary. A second issue is centering the undersize taper in the oblong hole 609, since an unsupported small fiber would tend to move to the edge of the hole 609. Supporting the taper at both ends avoids this problem, and keeps the center of the taper 608 centered in the hole 609. This has been accomplished by using a 10–12 mm capillary that ensures that the end of the capillary 610 extends a few millimeters beyond the end of the taper 611.

It should be emphasized that there are other micro-optic coupling devices where it would be beneficial to incorporate one or more tapers. For example, a wave length division multiplexor pump combiner could be made using such a device. Such devices are a simple modification of the device in FIG. 1 where the singlemode input 100 is replaced by another multimode fiber. One example of this would be a version of FIG. 1 where the isolator 105 is removed, where fibers 100, 109 and 110 are 85/125, 0.22 NA multimode fibers, and where the reflector 106 is made to transmit 910 nm and reflect 960 nm. In this configuration, a 910-nm source from fiber 100 and a 960 nm source from fiber 109 will both be imaged with unity magnification onto fiber 110. This imaging is exactly analogous to what is shown in FIG. 6, where fiber 403 is imaged into fiber 405, and requires the same external beam shaping optics if the actual multimode source is a 105/125, 0.15 NA fiber. By analogy to FIG. 7, the external beam shaping consisting of fibers 401 and 403 can be replaced by an internal taper analogous to fiber 501. Using such a fiber for 109 is exactly analogous to what is done in FIG. 7. Beam shaping from fiber 100 can be accomplished by changing the focal length and spacing of GRIN lens 102, or it can be accomplished by using a tapered fiber for fiber 100. The latter has the advantage that it leaves the mechanical components unchanged from the original unity-magnification device. In either case, the result is a wave length division multiplexer beam combiner that reshapes the two, diode inputs and combines them onto a single output fiber.

In light of the foregoing disclosure of this invention and description of certain preferred embodiments, those who are skilled in this area of technology will readily understand that various modifications and adaptations can be made without departing from the true scope and spirit of this invention. All such modifications and adaptations are intended to be covered by the following claims.

What is claimed is:

1. A method for constructing a micro-optic coupler that incorporates optical tapers to reshape multimode optical inputs to match the spatial properties of an output fiber, comprising:

receiving multimode optical inputs from at least one input fiber;

coupling the multimode inputs to at least one output fiber;

modifying a spatial profile of the multimode inputs using a doubleclad input fiber having a tapered end; and mounting the doubleclad input fiber in a glass capillary and polishing the glass capillary to expose the tapered end of the doubleclad input fiber, wherein the tapered end of the doubleclad input has a core diameter that is smaller than a core diameter of the at least one output fiber.

2. The method of claim 1, wherein the receiving the multimode optical inputs from at least one input fiber is performed using a multimode input fiber.

3. The method of claim 1, wherein the receiving the multimode optical inputs from at least one input fiber is performed using a double-clad fiber.

4. The method of claim 1, wherein the coupling the multimode optical inputs to at least one output fiber is performed using a multimode output fiber.

5. The method of claim 1, wherein the coupling the multimode optical inputs to at least one output fiber is performed using a double-clad output fiber.

6. The method of claim 1, further comprising imaging the multimode optical inputs using unity magnification onto the output fibers.

7. The method of claim 1, further comprising reflecting the multimode optical input and transmitting a singlemode input.

8. A micro-optic coupler, comprising:

a multimode signal beam from at least one fiber;

focusing elements coupling the multimode signal beam to a multimode output fiber having a core diameter; and a doubleclad input fiber having a core diameter that emits a pump beam, wherein the multimode output fiber and the doubleclad input fiber each have an equal outside diameter and an equal numerical aperture; and wherein the core diameter of the multimode output fiber is larger than the core diameter of the doubleclad input fiber, whereby a tapered input of the core diameter of the doubleclad input fiber modifies the spatial profile of the multimode signal beam.

9. The micro-optic coupler of claim 8, wherein the doubleclad input fiber comprises a tapered multimode fiber, and wherein the multimode output fiber comprises a nontapered multimode fiber.

10. The micro-optic coupler of claim 8, further comprising:

a glass capillary tube having an aperture, wherein the aperture is defined by an oblong circumference, and wherein the multimode output fiber and the doubleclad input fiber are centered within the aperture.

11. The micro-optic coupler of claim 8, wherein the pump beam and the multimode signal beam are co-propagated into the multimode output fiber.

12. The micro-optic coupler of claim 11, further comprising:

a GRIN lens coupled to the glass capillary tube for collecting the pump beam; and a reflector for reflecting the pump beam back through the GRIN lens having unity magnification onto the multimode output fiber.

* * * * *

UNITED STATES PATENT AND TRADEMARK OFFICE
CERTIFICATE OF CORRECTION

PATENT NO.   : 6,477,301 B1                                               Page 1 of 1
DATED        : November 5, 2002
INVENTOR(S)  : Anthon et al.

It is certified that error appears in the above-identified patent and that said Letters Patent is hereby corrected as shown below:

<u>Title page,</u>
Item [74], delete "Hubert J. Bernhardt, III;" and insert therefore
-- Hubert J. Barnhardt III --.

Signed and Sealed this

Twenty-seventh Day of May, 2003

JAMES E. ROGAN
*Director of the United States Patent and Trademark Office*